Dec. 28, 1937.  A. E. HANDY  2,103,327
MOVING STAIRWAY
Filed Aug. 18, 1937  2 Sheets-Sheet 2

Arthur Edward Handy INVENTOR
BY Walter E. S. Bradley ATTORNEY

Patented Dec. 28, 1937

2,103,327

UNITED STATES PATENT OFFICE 2,103,327

MOVING STAIRWAY

Arthur Edward Handy, Lynbrook, N. Y., assignor to Otis Elevator Company, New York, N. Y., a corporation of New Jersey Application August 18, 1937, Serial No. 159,650

6 Claims. (Cl. 198—16)

The invention relates to moving stairways.

Moving stairways comprise an endless series of steps which are moved from one landing to another for the purpose of conveying passengers. The steps are connected together by means of sprocket chains, known as running gear chains. It has been the practice for a considerable number of years to provide a running gear chain on each side of the stairway. Also, each step is provided with a plurality of wheels which run on tracks. Two of the wheels, arranged one on each side of the stairway, are associated with the running gear chains and are known as chain wheels. In present day moving stairways, the chain wheels are mounted on axles which extend across the stairway through rollers in the chain. Such construction is a possible source of noise. This is due to the working clearance which is provided for the chain wheel axles in the chains and to the wear which takes place at this point after the stairway has been in operation for a period of time. This clearance and wear may result in the axle slapping against different portions of the wall of the apertures provided for the axle in the chains as certain transitions in the operation of the stairway occur.

The object of the invention is to eliminate noise in operation of a moving stairway of such construction occasioned by the fit of the chain wheel axles in the running gear chain.

The invention involves maintaining the chain wheel axles against the walls of their respective apertures in the chains. In carrying out the invention according to the preferred arrangement, yieldable means is provided for each step which acts between means associated with the chains and the chain wheel axle to exert a force urging the axle against one side of the wall of the aperture in each of the chains through which the axle extends.

Features and advantages of the invention will be apparent from the following description and appended claims.

In the drawings:—

Figure 1:
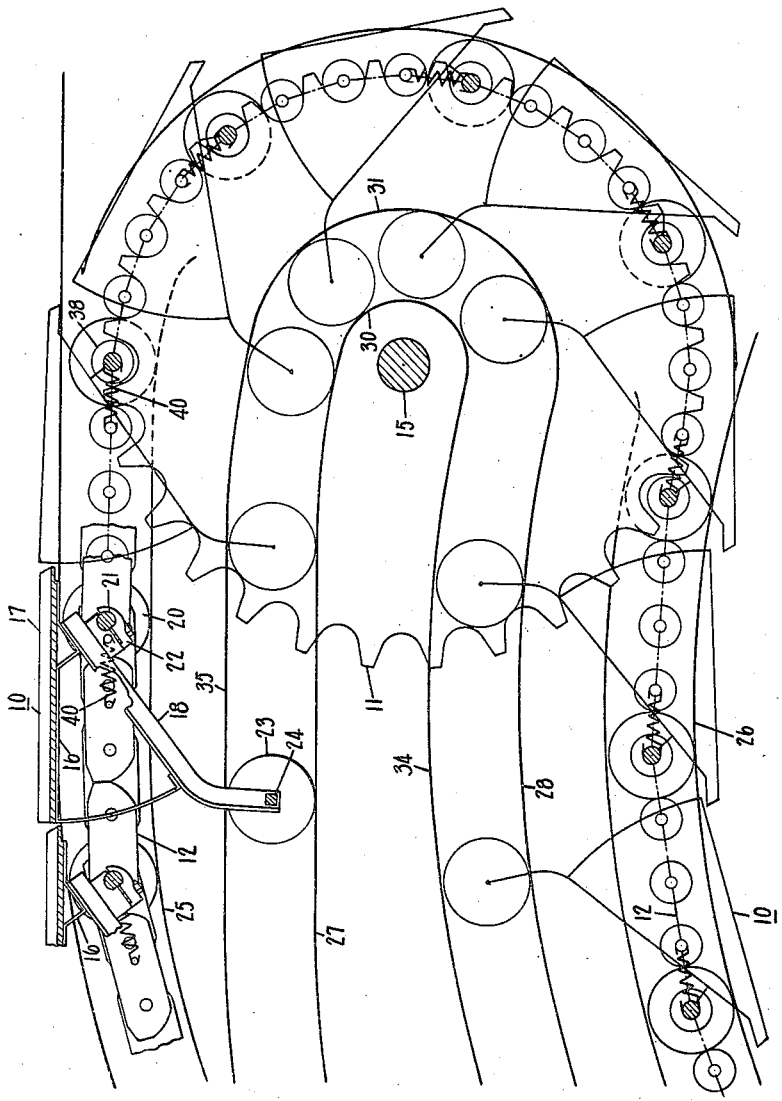
Figure 1 is a diagrammatic illustration in side elevation of the upper end of a moving stairway embodying the invention.

The stairway comprises an endless series of steps 10 driven at the upper end of the stairway by means of sprocket wheels through running gear chains, a sprocket wheel and chain being arranged on each side of the stairway. A sprocket wheel 11 and running gear chain 12 are illustrated for one side of the stairway. The sprocket wheels are mounted on and driven by the main drive shaft 15, driven in turn by driving mechanism (not shown).

Each step comprises a step frame 16 upon which the tread 17 is mounted. The frame is mounted on brackets 18, one on each side of the stairway. The chain wheels 20 for the step are mounted on an axle 21 extending across the stairway through opposite chain rollers in the running gear chains, the chain wheels being outside the links of the chains. The axle extends into axle blocks 22 secured to one end of step bracket 18 at each side of the stairway. The axle blocks clamp the axle against rotation, the axle being preferably flattened at this point to aid in preventing their turning. Each of the trailer wheels 23 for the step is mounted on an axle 24 supported by the other end of the step bracket 18.

An upper run track 25 and a return run track 26 are provided on each side of the stairway for the chain wheels. When the stairway is ascending, the chain wheels run on the upper run tracks until a position above the main drive shaft is reached, and thus support the steps up to this position. As this position is reached, the sprocket wheels 11 mesh with the rollers in the running gear chains through which the chain wheel axle extends to carry the step around the bend to a point below the main drive shaft where the chain wheels run onto their return run tracks. The reverse of the above described operation takes place when the stairway is descending.

An upper run track 27 and a return run track 28 are provided on each side of the stairway for the trailer wheels. Semi-circular guide tracks 30 and 31 provided on each side of the stairway guide the trailer wheels as they pass around the bend from one run to the other. The inner track 30 is a continuation of track 27 at the top and of an up thrust track 34 at the bottom. Similarly, outer track 31 is a continuation of track 28 at the bottom and of an up thrust track 35 at the top.

Figure 2:
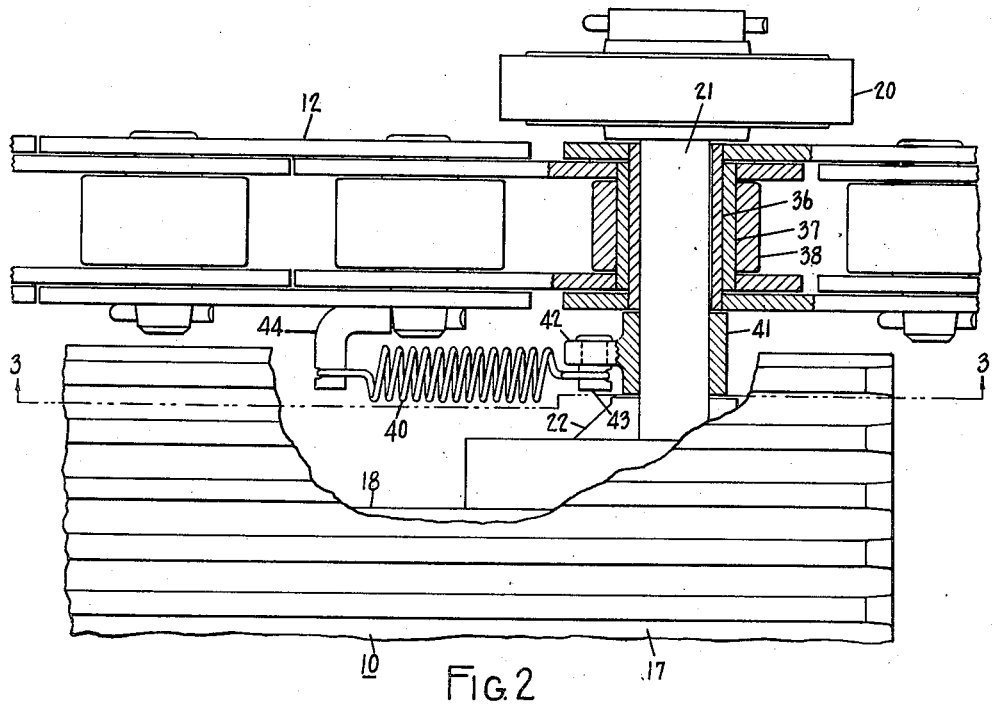
Figure 2 is an enlarged detail with parts broken away of the mounting of a chain wheel axle.
Figure 3:
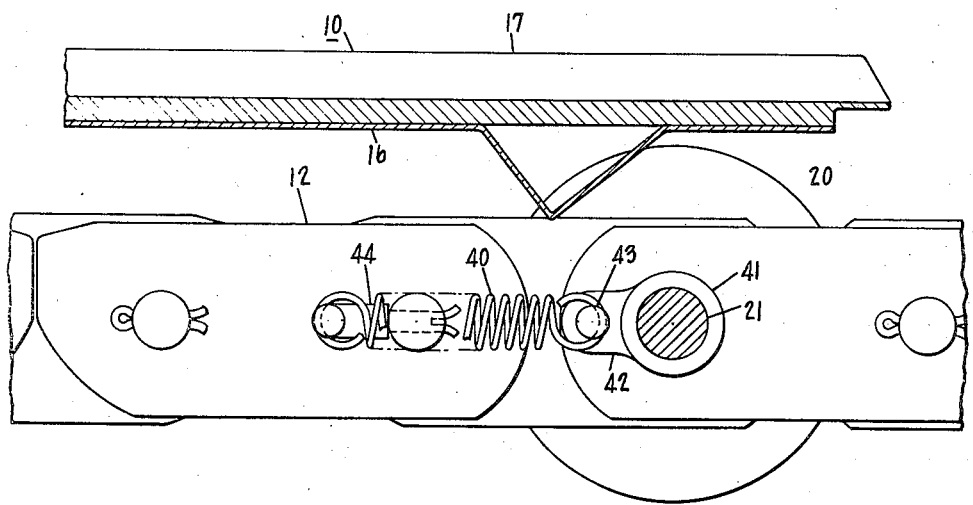
Figure 3 is a view taken along the line 3—3 of Figure 2.

As illustrated in Figure 2, each chain, at each point where a chain wheel axle extends through the chain, is provided with a bushing 36 to receive the axle. This bushing has a pressed fit in apertures formed in the outer links of the chain. This bushing extends through another bushing 37 for the chain roller 38. This latter bushing has a pressed fit in apertures formed in the inner links of the chain. A certain amount of working clearance is provided for the axles in their bushings 36 which increases with wear. To obviate any noise due to change in position of the axles on their bushings during operation of the stairway, mechanism is provided for maintaining the axles in contact with their bushings.

In the arrangement illustrated, this mechanism comprises a spring 40 for each axle for each chain arranged in tension between the axle and an adjacent link of the chain. The spring is secured to the axle by a collar 41 arranged on the axle between the chain and the axle blocks 22. The collar is provided with a lug 42 supporting a pin 43 on which one end of the spring is hooked. The other end of the spring is hooked onto a bent pin 44 secured to a roller pin in place of the cotter pin used for the other roller pins. The springs act to yieldingly maintain the axles against one side of their respective bushing 36, thereby eliminating the possibility of any noise in the operation of the stairway due to the fit of the chain wheel axles in the running gear chains.

It is to be understood that the invention may be carried out in various ways and is applicable to various forms of moving stairway construction. In constructions in which the chain wheel axles are rotatable with respect to the steps as well as to the chains, it would be preferable to hook the springs to the steps themselves instead of to separate collars, thereby taking up any clearance between the axles on their step bearings as well as between the axles on their chain bearings. As many different embodiments of the invention could be made without departing from the scope thereof, it is intended that all matter contained in the above description or shown in the accompanying drawings shall be interpreted as illustrative and not in a limiting sense.

What is claimed is:—

1. A moving stairway comprising; a series of steps; running gear chain for said steps; a wheel for each step; an axle for each wheel, said running gear chain being provided with an aperture for each axle through which the axle extends; and means for each step for yieldingly maintaining said axle for the wheel of that step against the wall of its aperture in said chain.

2. A moving stairway comprising; a series of steps; running gear chain for said steps; a wheel for each step; an axle for each wheel, said running gear chain being provided with an aperture for each axle through which the axle extends; and means for each step for maintaining said axle for the wheel of that step against the wall of its aperture in said chain at all positions of the step in its travel.

3. A moving stairway comprising; a series of steps; running gear chain for said steps; a wheel for each step; an axle for each wheel, said running gear chain being provided with an aperture for each axle through which the axle extends; and resilient means for each step secured to said axle for the wheel of that step and to said chain for maintaining the axle against the wall of its aperture in said chain at all positions of the step in its travel.

4. A moving stairway comprising; a series of steps; a pair of running gear chains for said steps; a pair of chain wheels for each step, one for each chain; an axle for the chain wheels of each step, said running gear chains being provided with aligned apertures for each axle through which the axle extends; and means for each step secured to said axle for the wheels of that step for yieldingly maintaining the axle against the wall of its aperture in each chain at all positions of the step in its travel.

5. A moving stairway comprising; a series of steps; a pair of running gear chains for said steps; a pair of chain wheels for each step, one for each chain; an axle for the chain wheels of each step, said running gear chains being provided with aligned apertures for each axle through which the axle extends and said chain wheels being arranged on said axles outside said chains; and a pair of springs for each axle, one for each chain, each spring being secured to the axle and chain for which it is provided for maintaining the axle against one side of the wall of its aperture in that chain.

6. A moving stairway comprising; a series of steps; a pair of running gear chains for said steps, each chain having a plurality of spaced rollers connected by links; a pair of chain wheels for each step, one for each chain; an axle for the chain wheel of each step, each running gear chain being provided with a plurality of apertures through chain rollers, one for each axle, the axles extending through aligned apertures in said chains and said chain wheels being arranged on said axles outside the links of said chains, each of the other rollers having roller pins; and a pair of springs for each axle, one for each chain, each spring being secured to the axle and to the roller pin of an adjacent roller of the chain for which it is provided for yieldingly maintaining the axle against one side of the wall of its aperture in that chain.

ARTHUR EDWARD HANDY.